United States Patent
Kwon

(10) Patent No.: US 9,979,772 B2
(45) Date of Patent: May 22, 2018

(54) DATA STREAMING METHOD OF AN ELECTRONIC DEVICE AND THE ELECTRONIC DEVICE THEREOF

(71) Applicant: Samsung Electronics Co., Ltd., Gyeonggi-do (KR)

(72) Inventor: Jae-Hwan Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 353 days.

(21) Appl. No.: 14/593,922

(22) Filed: Jan. 9, 2015

(65) Prior Publication Data

US 2015/0200991 A1 Jul. 16, 2015

(30) Foreign Application Priority Data

Jan. 10, 2014 (KR) .................. 10-2014-0003570

(51) Int. Cl.
*G06F 15/16* (2006.01)
*H04L 29/06* (2006.01)

(52) U.S. Cl.
CPC .......... *H04L 65/608* (2013.01); *H04L 65/604* (2013.01)

(58) Field of Classification Search
None
See application file for complete search history.

(56) References Cited

U.S. PATENT DOCUMENTS

| | | | | |
|---|---|---|---|---|
| 7,411,901 B1* | 8/2008 | Alexander | ............. | H04L 47/10 370/230 |
| 2003/0007507 A1* | 1/2003 | Rajwan | .................. | H04L 1/007 370/468 |
| 2006/0218264 A1* | 9/2006 | Ogawa | .................... | H04L 47/10 709/223 |
| 2009/0135898 A1* | 5/2009 | Bauchot | ................. | H04L 67/04 375/240.01 |
| 2012/0144445 A1* | 6/2012 | Bonta | ................ | H04L 12/1868 725/116 |
| 2013/0291040 A1 | 10/2013 | Rhyu et al. | | |
| 2013/0322439 A1* | 12/2013 | Verhallen | ................. | H04J 3/12 370/389 |
| 2014/0222962 A1* | 8/2014 | Mao | ................... | H04N 21/4305 709/219 |

(Continued)

FOREIGN PATENT DOCUMENTS

| | | | | |
|---|---|---|---|---|
| KR | 10-2012-0083747 | | 7/2012 | |
| WO | WO2014076052 | * | 11/2013 | ............. H04L 29/06 |
| WO | WO 2014076052 A1 * | | 5/2014 | ......... H04L 65/4076 |

*Primary Examiner* — Phyllis A Book

(57) ABSTRACT

A data streaming method of an electronic device include receiving an information file of a multimedia content from a server, retrieving time information for a unit of data transmission in the information file, and determining an allowed reception time of the data transmission time for a data transmission. An electronic device includes a communication interface configured to access a server, and a processor configured to communicate with the server accessed through the communication interface, wherein the processor is configured to receive an information file of a multimedia content from the server, retrieve time information of a data transmission unit in the information file, and determine an allowed reception time of the data transmission time based on the time information of the unit of data transmission.

14 Claims, 8 Drawing Sheets

(56) References Cited

U.S. PATENT DOCUMENTS

| | | | |
|---|---|---|---|
| 2014/0281007 A1* | 9/2014 | Lemmons | H04N 21/2355 709/231 |
| 2015/0089074 A1* | 3/2015 | Oyman | H04L 65/608 709/231 |
| 2015/0334153 A1* | 11/2015 | Koster | H04L 65/4069 709/219 |
| 2016/0050241 A1* | 2/2016 | Lotfallah | H04L 67/2804 709/219 |

* cited by examiner

```xml
<?xml version="1.0" encoding="UTF-8"?>
<MPD xmlns:xsi="http://www.a1.org/2001/XMLScema-instance"
    xmlns="urn:mpeg:DASH:schema:MPD:2013"
    xsi:schemaLocation="urn:mpeg:DASH:schema:MPD:2013"
    profiles="urn:mpeg:dash:profile:isoff-main:2013"
    type="static"
    mediaPresentationDuration="PT0H9M56.46S"
    minBufferTime="PT10.0S">
    <BaseURL> http://www-abc.ac.at/ftp/datasets/movie_10s/
    </BaseURL>
    <Period start="PT0S">
    <AdaptationSet bitstreamSwitching="true">
    <Representation id="0" codecs="avc1" mimeType="video/mp4" width="320" height="240"
    startWithSAP="1" bandwidth="45351">
        <SegmentBase>
        <Initialization sourceURL="movie_10s_100kbit/movie_100kbit_dash.mp4"/>
        </SegmentBase>
        <SegmentList duration="10">
            <SegmentURL media="movie_10s_100kbit/movie_10s1.m4s"/>
            <SegmentURL media="movie_10s_100kbit/movie_10s2.m4s"/>
            <!-- ... -->
        </SegmentList>
    </Representation>
    <!-- ... -->
    </AdaptationSet>
    </Period>
</MPD>
```

FIG.5

DATA STREAMING METHOD OF AN ELECTRONIC DEVICE AND THE ELECTRONIC DEVICE THEREOF

CROSS-REFERENCE TO RELATED APPLICATION

The present application is related to and claims the benefit under 35 U.S.C. § 119(a) to a Korean patent application filed on Jan. 10, 2014 in the Korean Intellectual Property Office and assigned Serial Number. 10-2014-0003570, the entire disclosure of which is hereby incorporated by reference.

TECHNICAL FIELD

The present disclosure relates generally to a data streaming method of an electronic device and the electronic device thereof.

BACKGROUND

Various electronic devices such as smart phones or tablet Personal Computers (PCs) can play a multimedia content by downloading or streaming it such as video from a content server. The downloading commences the play after the electronic device downloads the whole multimedia content, and the streaming seamlessly plays the content in order while the electronic device receives part of the content.

Real-Time Streaming Protocol (RTSP), which is a streaming protocol, establishes a session when a server and a client are connected. The session is used to maintain the play of the client. The session changes its state according to a client's command, for example, play start, pause, and stop. During the session, the server sends packet-based media data and the server controls packet flow in an appropriate amount according to a play speed.

A progressive download begins the playback while receiving part of a media file. To move to the point not received yet, the client should support Hypertext Transfer Protocol (HTTP) 1.1 spec. The server manages the status of the client in the RTSP, whereas the server does not manage the status of the client in the HTTP where one request is processed in an independent one-time session.

A HTTP adaptive streaming combines the typical streaming and the HTTP download. For example, the content is divided into segments and each segment is transmitted as a data transmission unit using the HTTP. Since the HTTP adaptive streaming does not need to maintain the streaming session, it facilitates implementation and reduces load on the server. Further, the HTTP adaptive streaming is free from a firewall or a router, can use an infrastructure for the HTTP, for example, a proxy or a cache, and can dynamically send the adequate segment according to a network condition.

The HTTP adaptive streaming includes, for example, HTTP Live Streaming of Apple Inc., Smooth Streaming of Microsoft Inc., HTTP Dynamic Streaming of Adobe Inc., and Dynamic Adaptive Streaming over HTTP (DASH) of International Organization for Standardization (ISO) standard. For example, Moving Picture Experts Group (MPEG)-DASH of the HTTP Adaptive Streaming published as ISO/IEC 23009-1 can combine audio and video in a single file like the HTTP Live Streaming, or separate the audio and the video in respective files like the Smooth Streaming.

The MPEG-DASH partitions the multimedia content such as video into segments and sends the segments at various bit rates. For example, the client requests the server in every segment to send the segment of a particular bit rate adequate for the network condition by executing a Rate Determinate Algorithm (RDA), and the server sends the segment of the requested bit rate to the client. However, when the network condition between the client and the server abruptly changes, for example, when a network bandwidth becomes narrow, the streaming time of the corresponding segment is extended. As a result, the video play screen displayed in the client is subject to the buffering or the freeze.

SUMMARY

To address the above-discussed deficiencies of the prior art, it is a primary aspect of the present disclosure to provide a data streaming method of an electronic device for streaming and seamlessly playing a multimedia content such as video in various electronic devices such as smart phones or tablet PCs, and the electronic device thereof.

According to one aspect of the present disclosure, a method for operating an electronic device includes receiving an information file of a multimedia content from a server, retrieving time information for a unit of data transmission in the information file, and based on the time information of the unit of data transmission, determining an allowed reception time of the data transmission time.

According to another aspect of the present disclosure, an electronic device includes a communication interface for accessing a server, and a processor for communicating with the server accessed through the communication interface. The processor receives an information file of a multimedia content from the server, retrieves time information of a unit of data transmission in the information file, and determines an allowed reception time of the data transmission time based on the time information of the unit of data transmission.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates the MPD file of the MPEG-DASH;

Throughout the drawings, like reference numerals will be understood to refer to like parts, components and structures.

DETAILED DESCRIPTION

Figure 1:
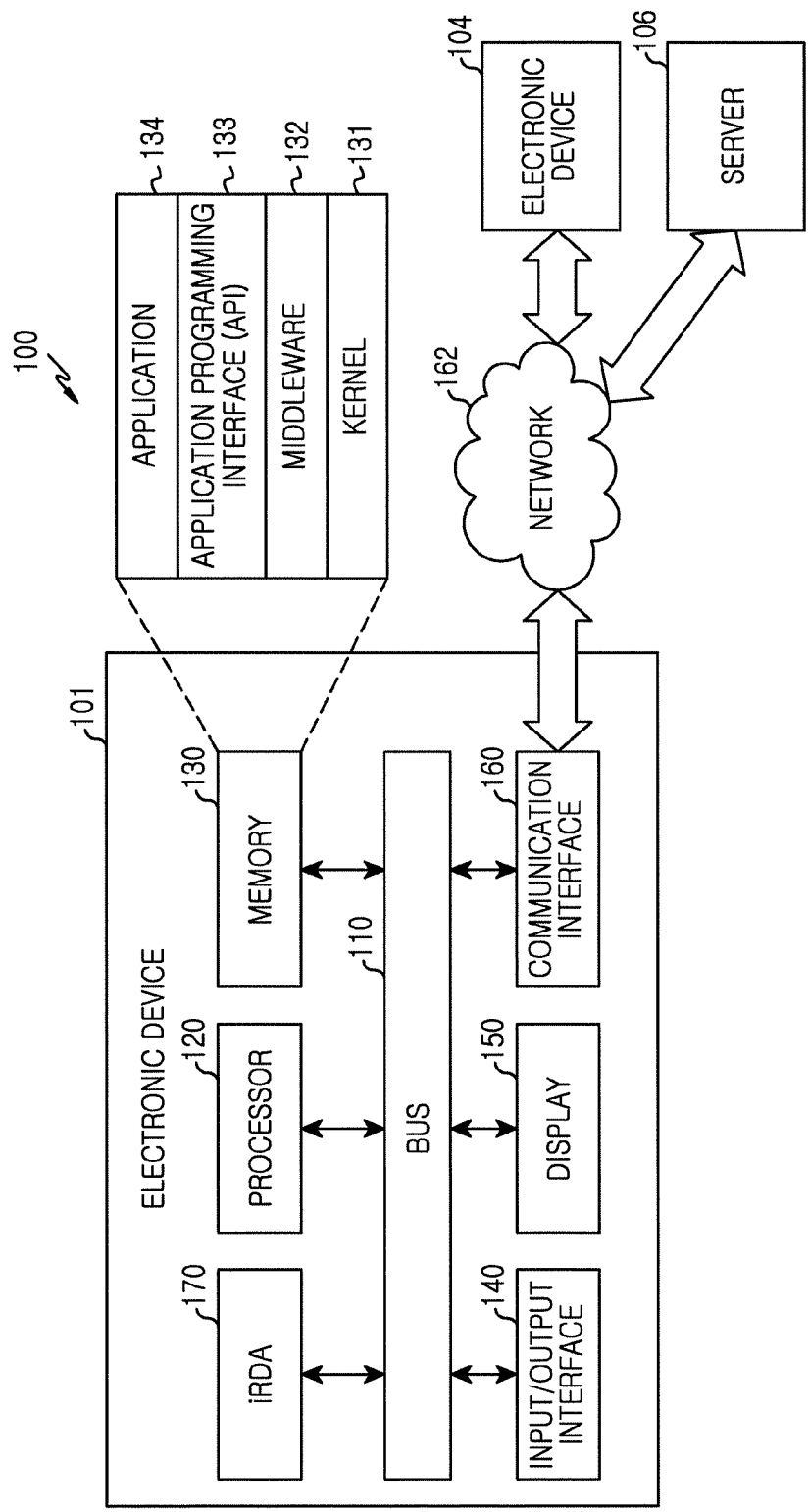
FIG. 1 illustrates a network including an electronic device according to one embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions can be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, can occur in amounts that do not preclude the effect the characteristic was intended to provide.

An electronic device according to the present disclosure can employ a device having a communication function. The electronic device can include at least one of, for example, a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical appliance, a camera, and a wearable device (e.g., Head-Mounted-Device (HMD) such as electronic glasses, e-textiles, electronic bracelet, electronic necklace, appcessory, electronic tattoo, and smartwatch).

The electronic device can employ a smart home appliance having the communication function. The smart home appliance can include at least one of, for example, a television, a Digital Versatile Disc (DVD) player, an audio system, a refrigerator, an air conditioner, a vacuum, an oven, a microwave oven, a washing machine, an air purifier, a set-top box, a TV box (e.g., Samsung HomeSync™, AppleTV™, Google TV™), a game console, an electronic dictionary, an electronic key, a camcorder, and a digital frame.

The electronic device can employ at least one of medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), a in-vehicle infotainment device, marine electronic equipment (e.g., marine navigation device and gyro compass), avionics, a security device, a vehicle head unit, an industrial or home robot, an Automatic Teller's Machine (ATM) of a financial company, and a Point of Sale (POS) of a store.

The electronic device can employ at least one of part of furniture or building/structure having the communication function, an electronic board, an electronic signature receiving device, a projector, and various gauges (e.g., gauges for water, electricity, and radio wave). The electronic device can include one or a combination of those various devices. The electronic device can be a flexible device. Those skilled in the art shall understand that the electronic device of the present disclosure is not limited those devices.

Hereinafter, exemplary embodiments of the present disclosure provide an electronic device. The term 'user' can represent a person or a device (e.g., artificial intelligent electronic device) who or which uses the electronic device.

FIG. 1 depicts a network 100 including an electronic device 101 according to an exemplary embodiment of the present disclosure. Referring to FIG. 1, the electronic device 101 can include a bus 110, a processor 120, a memory 130, an input/output interface 120, a display 150, a communication interface 160, and an intelligent Rate Determinate Algorithm (iRDA) 170. The iRDA 170 can be included in the processor 120, or in a separate module to interwork with the processor 120. Hereinafter, the iRDA 170 is included in the processor 120. The bus 110 can be a circuit for interlinking the above-stated components and transferring communication (e.g., control messages) between the above-stated components.

The processor 120 can receive an instruction from the other components (e.g., the memory 130, the input/output interface 120, the display 150, and the communication interface 160) via the bus 110, interpret the received instruction, and perform an operation or a data processing according to the interpreted instruction. The memory 130 can store the instruction or the data received from or generated by the processor 120 or the other components (e.g., the user input module 120, the display 150, and the communication interface 160). For example, the memory 130 can include programming modules including, for example, a kernel 131, a middleware 132, an Application Programming Interface (API) 133, and an application 134. The programming modules can be implemented using software, firmware, and hardware, or a combination of at least two of them.

The kernel 131 can control or manage system resources (e.g., the bus 110, the processor 120, or the memory 130) used to execute the operation or the function of the other programming modules, for example, the middleware 132, the API 133, or the application 134. Also, the kernel 131 can provide an interface allowing the middleware 132, the API 133, or the application 134 to access and to control or manage the individual component of the electronic device 101.

The middleware 132 can relay data between the API 133 or the application 134 and the kernel 131. In response to work requests received from the application 134, the middleware 132 can, for example, control the work requests (e.g., scheduling or load balancing) by giving priority of the system resource (e.g., the bus 110, the processor 120, or the memory 130) of the electronic device 101 to at least one application of the application 134. The API 133, which is an interface for the application 134 to control the function provided from the kernel 131 or the middleware 132, can include at least one interface or function (e.g., instruction) for, for example, file control, window control, image processing, or text control.

The application 134 can include a Short Message Service (SMS/Multimedia Messaging Service (MMS) application, an e-mail application, a calendar application, an alarm application, a health care application (e.g., an application for measuring an exercise or a blood sugar), or an environment information application (e.g., an application for providing air pressure, humidity, or temperature information). Additionally or substantially, the application 134 can be an application relating to information exchange between the electronic device 101 and an external electronic device (e.g., an electronic device 104). The information exchange application can include, for example, a notification relay application for relaying particular information to the external electronic device, or a device management application for managing the external electronic device.

For example, the notification relay application can relay notification information of the other application (e.g., the SMS/MMS application, the e-mail application, the health care application, or the environment information application) of the electronic device 101 to the external electronic device (e.g., the electronic device 104). Additionally or substantially, the notification relay application can receive and forward the notification information from the external electronic device (e.g., the electronic device 104) to the user. The device management application can manage (e.g., install, delete, or update) at least part of the function (e.g., turn-on/turn-off of the external electronic device (or some components) or display brightness (or resolution) control) of the external electronic device (e.g., the electronic device 104) communicating with the electronic device 101, the application running on the external electronic device, or a service (e.g., a call service or a message service) provided by the external electronic device.

The application 134 can include an application designated based on an attribute (e.g., a type of the electronic device) of the external electronic device (e.g., the electronic device 104). For example, when the external electronic device is an MP3 player, the application 134 can include an application relating to music play. Similarly, when the external electronic device is a mobile medical device, the application 134 can include an application relating to health care. The application 134 can include at least one of the applications designated in the electronic device 101 or the application received from the external electronic device (e.g., a server 106 or the electronic device 104).

The input/output interface 120 can forward the instruction or the data input from the user through an input/output device (e.g., a sensor, a keyboard, or a touch screen) to the processor 120, the memory 130, and the communication interface 160, for example, via the bus 110. For example, the input/output interface 120 can forward the data of user's touch input through the touch screen, to the processor 120. Also, the input/output interface 120 can output the instruction or the data received from the processor 120, the memory 130, and the communication interface 160, for example, via the bus 10, through the input/output device (e.g., a speaker or a display). For example, the input/output interface 120 can output voice data processed by the processor 120 to the user through the speaker.

The display 150 can display various information (e.g., multimedia data or text data) to the user. The communication interface 160 can connect the communication between the electronic device 101 and the external device (e.g., the electronic device 104 or the server 106). For example, the communication interface 160 can communicate with the external device by accessing the network 162 using wireless communication or wired communication. The wireless communication can include at least one of, for example, Wireless Fidelity (Wifi), Bluetooth (BT), Near Field Communication (NFC), Global Positioning System (GPS), or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication can include at least one of, for example, Universal Serial Bus (USB), High Definition Multimedia Interface (HDMI), Recommended Standard (RS) 232, and Plain Old Telephone Service (POTS).

The network 162 can be a telecommunications network. The telecommunications network can include at least one of a computer network, Internet, Internet of things, or a telephone network. A protocol (e.g., transport layer protocol, data link layer protocol, or physical layer protocol) for the communication between the electronic device 101 and the external device can be supported by at least one of the application 134, the application programming interface 133, the middleware 132, the kernel 131, or the communication interface 160.

Figure 2:
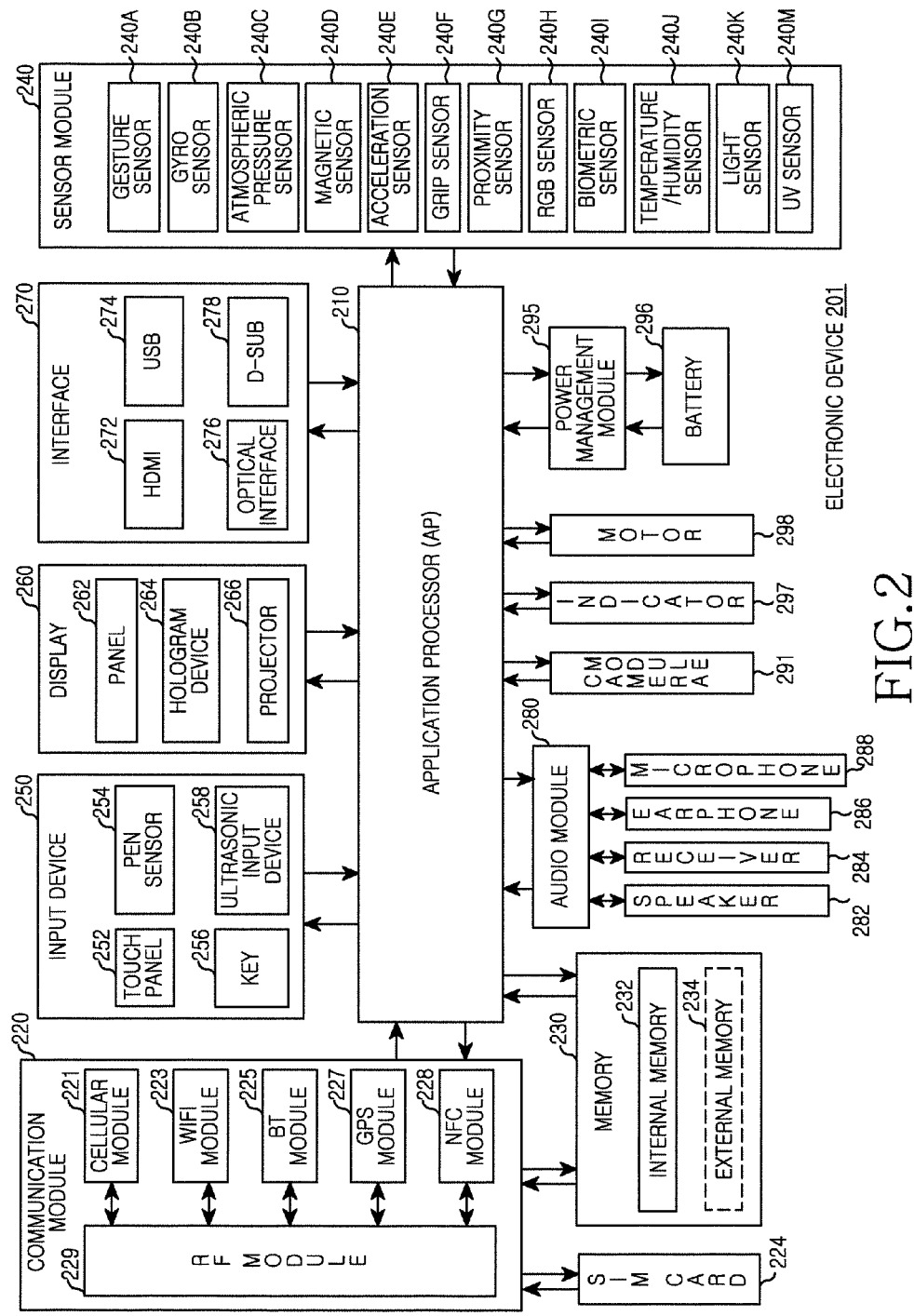
FIG. 2 illustrates an electronic device according to one embodiment of the present disclosure.

FIG. 2 is a block diagram of an electronic device 201 according to an exemplary embodiment of the present disclosure. The electronic device 201 can configure all or part of, for example, the electronic device 101 of FIG. 1. Referring to FIG. 2, the electronic device 201 can include one or more Application Processors (APs) 210, a communication module 220, a Subscriber Identity Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 can control a plurality of hardware or software components connected to the AP 210 by driving an operating system or an application program, and carry out various data processing and operations including multimedia data. The AP 210 can be implemented using, for example, a System on Chip (SoC). The processor 210 can further include a Graphic Processing Unit (GPU) (not shown).

The communication module 220 (e.g., the communication interface 160) can transmit and receive data in the communications between the electronic device 201 (e.g., the electronic device 101) and other electronic devices (e.g., the electronic device 104 or the server 106) connected via a network. The communication module 220 can include a cellular module 221, a Wifi module 223, a BT module 225, a GPS module 227, an NFC module 228, and a Radio Frequency (RF) module 229.

The cellular module 221 can provide a voice call, a video call, a text message service, or an Internet service over the communication network (e.g., LTE, LTE-A, CDMA, WCDMA, UMTS, WiBro, or GSM). Also, the cellular module 221 can identify and authenticate the electronic device in the communication network using a subscriber identity module (e.g., the SIM card 224). The cellular module 221 can perform at least part of functions provided by the AP 221. For example, the cellular module 221 can perform at least part of a multimedia control function.

The cellular module 221 can include a Communication Processor (CP). Also, the cellular module 221 can be implemented using, for example, the SoC. While the components of the cellular module 221 (e.g., the communication processor), the memory 230, or the power management module 295 are depicted separately from the AP 221 in FIG. 2, the AP 210 can include at least part (e.g., the cellular module 221) of the above-stated components according to an exemplary embodiment.

The AP 210 or the cellular module 221 (e.g., the communication processor) can load and process the instruction or the data received from its connected non-volatile memory or at least one of the other components, in a volatile memory. Also, the AP 210 or the cellular module 221 can store data received from at least one of the other components or generated by at least one of the other components, in the non-volatile memory.

The Wifi module 223, the BT module 225, the GPS module 227, or the NFC module 228 each can include, for example, a processor for processing the data transmitted and received via the corresponding module. While the cellular module 221, the Wifi module 223, the BT module 225, the GPS module 227, or the NFC module 228 is depicted as the separate block in FIG. 2, at least part (e.g., at least two) of the cellular module 221, the Wifi module 223, the BT module 225, the GPS module 227, or the NFC module 228 can be included in a single Integrated Chip (IC) or an IC package. For example, at least part (e.g., the communication processor corresponding to the cellular module 221 and the Wifi processor corresponding to the Wifi module 223) of the processors corresponding to the cellular module 221, the Wifi module 223, the BT module 225, the GPS module 227, or the NFC module 228 can be implemented using a single SoC.

The RF module 229 can transmit and receive the data, for example, RF signals. The RF module 229 can include, for example, a transceiver, a Power Amp Module (PAM), a frequency filter, or a Low Noise Amplifier (LNA) which is not shown. Also, the RF module 229 can further include a component for sending and receiving electromagnetic waves in free space during the wireless communication, for example, a conductor or a conducting wire. While the cellular module 221, the Wifi module 223, the BT module 225, the GPS module 227, and the NFC module 228 share the single RF module 229 in FIG. 2, at least one of the cellular module 221, the Wifi module 223, the BT module 225, the GPS module 227, or the NFC module 228 can transmit and receive the RF signals via a separate RF module.

The SIM card 224 can be a card including the subscriber identity module and be inserted to a slot formed at a specific location of the electronic device. The SIM card 224 can include unique identification information (e.g., Integrated Circuit Card Identifier (ICCID)) or subscriber information (e.g., International Mobile Subscriber Identity (IMSI)). The memory 230 (e.g., the memory 130) can include an internal memory 232 or an external memory 234. The internal memory 232 can include at least one of, for example, the volatile memory (e.g., Dynamic RAM (DRAM), Static RAM (SRAM), Synchronous Dynamic RAM (SDRAM)) or the non-volatile memory (e.g., One-Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory).

The internal memory 232 can be a Solid State Drive (SSD). The external memory 234 can include a flash drive, for example, a Compact Flash (CF), a Secure Digital (SD), a Micro-Secure Digital (SD), a Mini-SD, an extreme digital (xD), or a memory stick. The external memory 234 can be functionally connected to the electronic device 201 via various interfaces. The electronic device 201 can further include a storage device (or a storage medium) such as hard drive.

The sensor module 240 can measure a physical quantity or detect the operation status of the electronic device 201, and convert the measured or detected information to an electric signal. The sensor module 240 can include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., Red Green Blue (RGB) sensor), a biometric sensor 240I, a temperature/humidity sensor 240J, a light sensor 240K, or an UltraViolet (UV) sensor 240M. Additionally/substantially, the sensor module 240 can include, for example, an E-noise sensor (not shown), an electromyography (EMG) sensor (not shown), an electroencephalogram (EEG) sensor (not shown), an electrocardiogram (ECG) sensor (not shown), an Infra Red (IR) sensor (not shown), an iris sensor (not shown), or a finger print sensor (not shown). The sensor module 240 can further include a control circuit for controlling its one or more sensors.

The input device 250 can include a touch panel 252, a (digital) pen sensor 254, a key 256, or an ultrasonic input device 258. For example, the touch panel 252 can recognize touch input using at least one of capacitive, resistive, infrared, and ultrasonic wave techniques. Also, the touch panel 252 can further include a controller. The capacitive type can recognize physical contact or proximity. The touch panel 252 can further include a tactile layer. In this case, the touch panel 252 can provide a tactile response to the user.

The (digital) pen sensor 254 can be implemented using, for example, the same or similar method as or to the user's touch input, or using a separate recognition sheet. For example, the key 256 can include, for example, a physical button, an optical key, or a keypad. The ultrasonic input device 258 is a device capable of obtaining data by detecting microwaves through a microphone (e.g., a microphone 288) in the electronic device 201 through an input tool which generates an ultrasonic signal, allows radio frequency identification. The electronic device 201 can receive user input from an external device (e.g., a computer or a server) connected using the communication module 220.

The display 260 (e.g., the display 150) can include a panel 262, a hologram device 264, or a projector 266. The panel 262 can employ, for example, a Liquid-Crystal Display (LCD) or an Active-Matrix Organic Light-Emitting Diode (AMOLED). The panel 262 can be implemented, for example, flexibly, transparently, or wearably. The panel 262 can be constructed as the single module with the touch panel 252. The hologram device 264 can present a three-dimensional image in the air using interference of light. The projector 266 can display the image by projecting the light onto a screen. The screen can be placed, for example, inside or outside the electronic device 201. The display 260 can further include a control circuit for controlling the panel 262, the hologram device 264, or the projector 266.

The interface 270 can include, for example, a High-Definition Multimedia Interface (HDMI) 272, a Universal Serial Bus (USB) 274, an optical interface 276, or a D-subminiature (D-sub) 278. The interface 270 can be included in, for example, the communication interface 160 of FIG. 1. Additionally/substantially, the interface 270 can include, for example, Mobile High-Definition Link (MHL) interface, Secure Digital (SD) card/Multi-Media Card (MMC) interface, or Infrared Data Association (IrDA) standard interface.

The audio module 280 can convert sound to an electric signal and vice versa. At least part of the audio module 280 can be included in, for example, the input/output interface 120 of FIG. 1. The audio module 280 can process sound information which is input or output through, for example, a speaker 282, a receiver 284, an earphone 286, or the microphone 288. The camera module 291 is a device for capturing a still picture and a moving picture, and can include one or more image sensors (e.g., a front sensor or a rear sensor), a lens (not shown), an Image Signal Processor (ISP) (not shown), or a flash (e.g., LED or xenon lamp) (not shown).

The power management module 295 can manage power of the electronic device 201. The power management module 295 can include, although not depicted, for example, a Power Management Integrated Circuit (PMIC), a charger Integrated Circuit (IC), or a battery fuel gauge. The PMIC can be mounted in, for example, an IC or a SoC conductor. The charging type can be divided to a wired type and a wireless type. The charger IC can charge the battery, and prevent overvoltage or overcurrent flow from the charger. The charger IC can include a charger IC for at least one of the wired charging type or the wireless charging type.

The wireless charging type includes, for example, a magnetic resonance type, a magnetic induction type, or a microwave type, and can add an additional circuit for the wireless charging, for example, a circuit such as coil loop, resonance circuit, or rectifier. The battery gauge can, for example, measure the remaining capacity of the battery 296 and the voltage, the current, or the temperature of the charging. The battery 296 can generate or store electricity, and supply the power to the electronic device 201 using the stored or generated electricity. The battery 296 can include, for example, a rechargeable battery or a solar battery The indicator 297 can display a specific status of the electronic device 201 or its part (e.g., the AP 210), for example, booting state, message state, or charging state. The motor 298 can convert the electric signal to a mechanic vibration. Although it is not depicted, the electronic device 201 can include a processing device (e.g., a GPU) for mobile TV support. The processing device for the mobile TV support can process media data in conformity to a standard, for example, Digital Multimedia Broadcasting (DMB), Digital Video Broadcasting (DVB), or media flow.

The aforementioned components of the electronic device according to various exemplary embodiments of the present disclosure each can include one or more components, and the name of the corresponding component can differ according to the type of the electronic device. The present electronic device can include at least one of the aforementioned components, omit some components, or further include other components. Also, some of the components of the present electronic device can be united into a single entity to thus carry out the same functions of the corresponding components.

Figure 3:
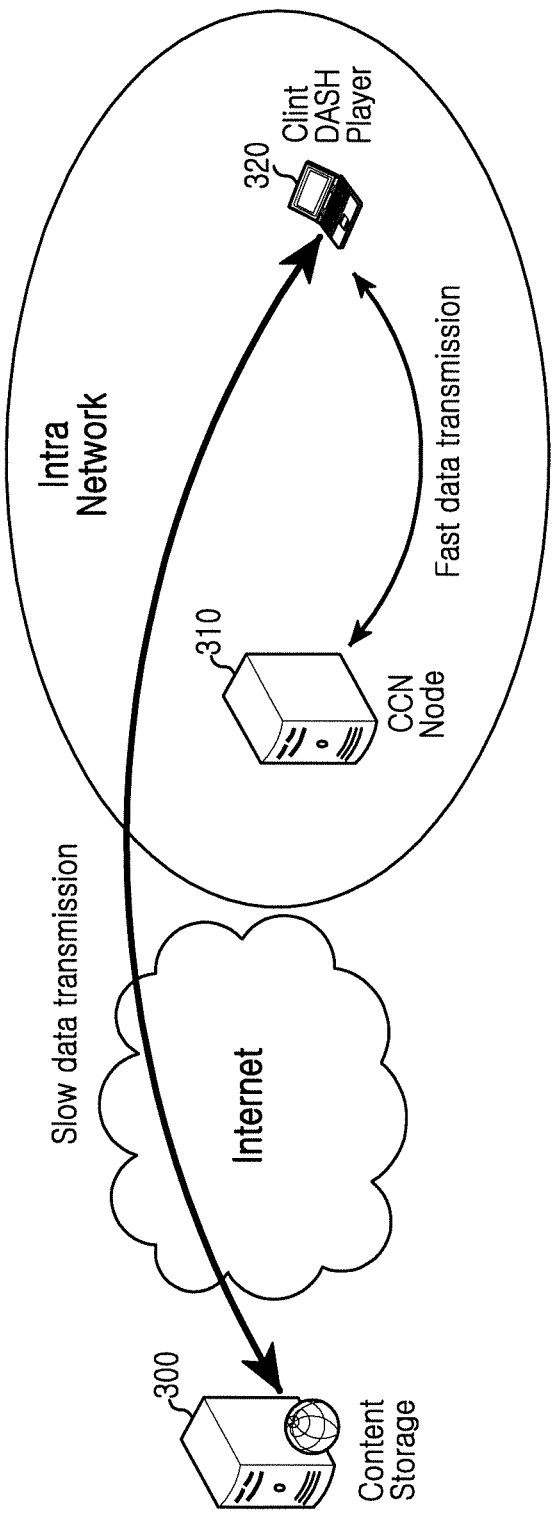
FIG. 3 illustrates a content centric network.

FIG. 3 depicts a Content Centric Network (CCN). The CCN is a network structure of new paradigm recently proposed to address the rapid growth of the network traffic in Internet as a video service such as Netflix or YouTube is widely used. In contrary to a conventional IP-based network, the CCN is the content-based network. The CCN can include, for example, a content server 300, a CCN node 310, and a client 320 as shown in FIG. 3.

The content server 300 includes a large content storage for storing original multimedia contents. The CCN node 310 includes a small cache storage (not shown) for storing the duplicated multimedia contents. The client 320 can access the CCN node 310 and receive fast the duplicated multimedia content stored in the cache storage over an intranet, or access the content server 300 and slowly receive the original multimedia content stored in the content storage over the Internet.

The multimedia content can be stored as a medial file of a format defined by the MPEG-DASH standard. Now, the terms are defined in brief. A content component is a component (e.g., video, audio, and subtitles) of the content. Representation represents the content, and low-quality and high-quality representations have the same context.

The media file can include the representation obtained by encoding the content component of the same content with different conditions (e.g., network bandwidth, resolution, and codec); a period obtained by dividing the total content length into a plurality of parts; and the segment to send within a short time (e.g., 1~10 second) by segmenting the period into groups for adaptive combination indicating information satisfying various conditions such as representation attribute or subtitle.

The media file can include a Media Presentation Description (MPD) file which specifies a file name, a sequence number, a start time, and a length of the segment, or can be linked to the MPD file. When the client 320 selects an arbitrary content, the content server 300 or the CCN node 310 sends the MPD file included in or linked to the media file of the corresponding content to the client 320. The client 320 downloads the MPD file and parses various information.

Figure 4:
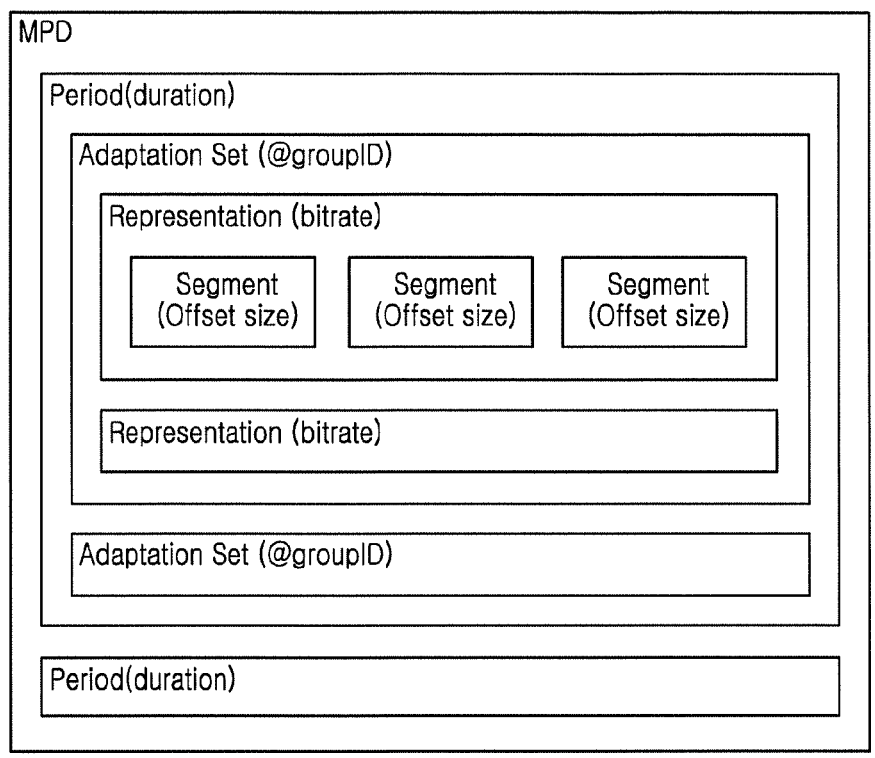
FIG. 4 illustrates an MPD file structure of MPEG-DASH.

FIG. 4 depicts a MPD file structure of the MPEG-DASH. Referring to FIG. 4, the MPD file can have a hierarchical structure including the period partitioned based on a duration; an adaptation set obtained by combining a language identifier of subtitle and audio signals, a media signal identifier, a representation role, preference, and a common attribute (e.g., width, height, diagonal length, the number of frames, the number of channels, signal sampling rate, and media codec type) with the same condition and distinguished by @groupID; the representation encoded with the bit rate and the different conditions (e.g., network bandwidth, resolution, and codec); and the segment for segmenting the representation based on time and space according to the playback condition and the transmission environment, and representing with an offset and a size.

The segment is a unit of data transmission transmitted from the server to the client at a time, and can be set to the short time corresponding, for example, 1 to 10 seconds. The client 320 identifies the representation by parsing the information in the MPD file, determines performance and capability of the client device, and the network speed, and sequentially receives the segments of the adequate bit rate, and plays the segments.

When the changeable variables such as network bandwidth varies, for example, when the network speed increases, the client 320 requests, receives, and plays the segment made with a high bit rate of high quality. When the network speed decreases, the client 320 requests, receives, and plays the segment made with a low bit rate of low quality. Thus, the play quality varies with the network speed, whereas the playback continues seamlessly. However, when the network speed drops because of the change of the network bandwidth, the streaming time taken to receive one segment is too long and thus the played screen is subject to the buffering or the freeze.

To prevent this shortcoming, the present electronic device determines an allowed reception time of the segment by retrieving time information of the segment of the MPD file. The MPD file can be referred to an information file of the multimedia content, and the segment can be referred to as the unit of data transmission, and the allowed reception time can be referred to as a deadline time (dt).

FIG. 5 depicts the MPD file of the MPEG-DASH. Referring to FIG. 5, the MPD file can be written as an eXtensible Markup Language (XML) file in a markup language such as Hyper Text Markup Language (HTML). The MPD file can include various information such as BaseURL specifying a common Uniform Resource Locator (URL) of other segments or resources, Period specifying the duration of the media information, AdaptationSet being a set of one or more interchangeable encoded versions, Representation indicating one or more deliverable encoded versions; and Segment being the data transmission unit received with one HTTP request.

Segment List Duration of FIG. 5 is time information corresponding to a play time of the corresponding segment. For example, when the Segment List Duration is 10 s, the play time of the corresponding segment is 10 seconds. The iRDA 170 of the electronic device 101 of FIG. 1 determines the allowed segment reception time by retrieving the time information of the Segment List Duration.

The allowed reception time is proportional to a time value of the Segment List Duration, and is shorter than the time value of the Segment List Duration. For example, when the Segment List Duration is 10 seconds, the allowed reception time is set to 2 seconds. When the Segment List Duration is 5 seconds, the allowed reception time is set to 1 second.

Figure 6:
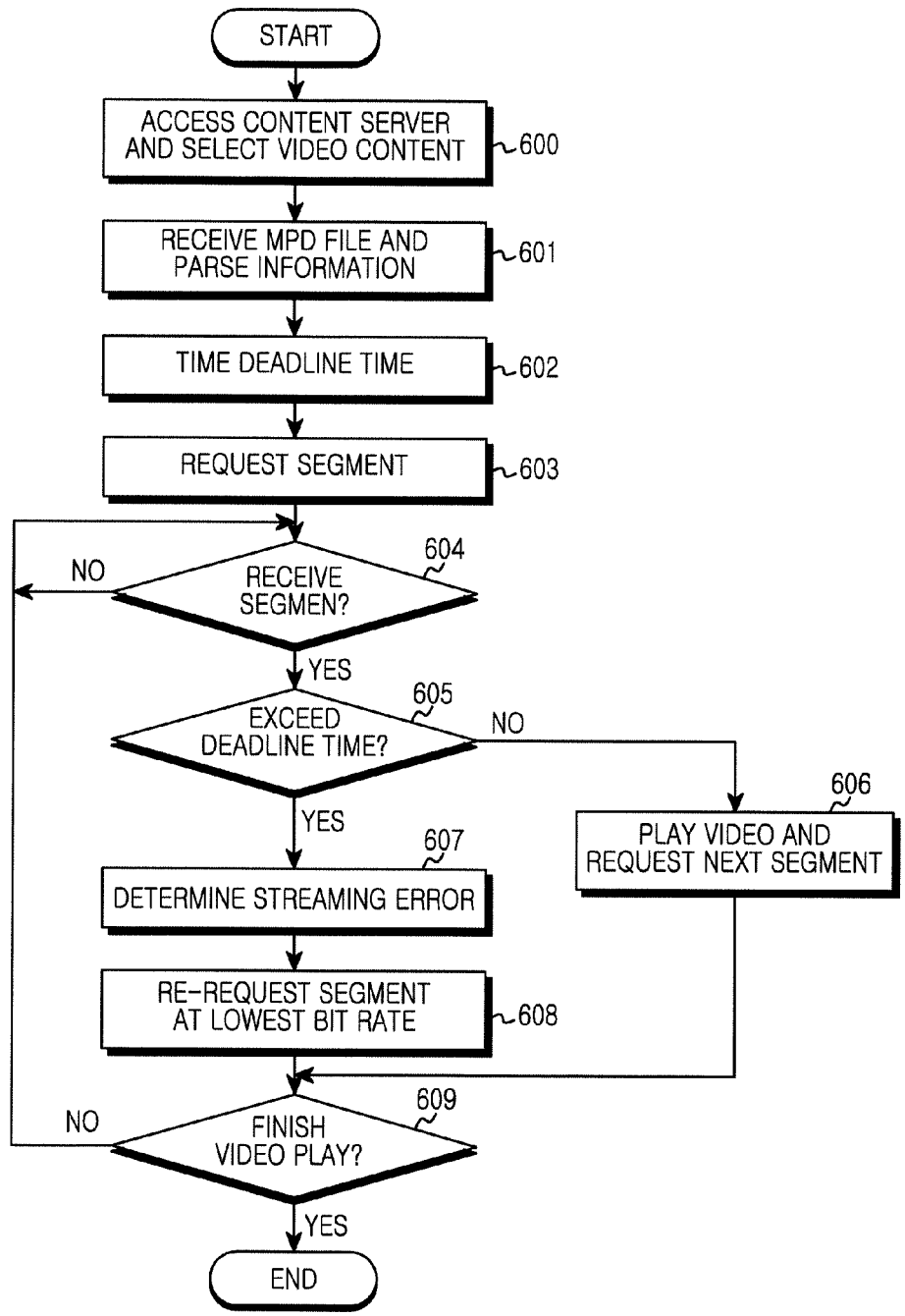
FIG. 6 illustrates operations of the electronic device according to one embodiment of the present disclosure.

FIG. 6 illustrates operations of the electronic device according to an exemplary embodiment of the present disclosure. The iRDA 170 of the electronic device 101 of FIG. 1 can, for example, be included in the processor 120 or in a separate module. Hereafter, the iRDA 170 operates in the processor 120. Referring now to FIG. 6, in step 600, the processor 120 accesses the content server 300 over the Internet or the CCN node 310 over the intranet, and then selects a video content desired by the user.

In step 601, the processor 120 downloads the MPD file from the content server 300 or the CCN node 310 and then parses the various information in the MPD file. In step 602, the processor 120 obtains the segment time information, for example, the Segment List Duration of the MPD file, and then determines the time which is proportional to the time value of the Segment List Duration and shorter than the time value of the Segment List Duration, as the dt being the allowed reception time of the corresponding segment.

In step 603, the processor 120 executes the RDA for selecting the segment of the bit rate adequate for the network environment and thus requests the content server 300 or the CCN node 310 to send the segment of the corresponding bit rate. In step 604, the processor 120 determines whether the segment is received from the content server 300 or the CCN node 310. In step 605, the processor 120 compares the segment reception time, that is, the segment streaming time with the dt. When the streaming time does not exceed the dt, the processor 120 plays the streamed segment and concurrently requests the next segment in step 606.

By contrast, when the streaming time exceeds the dt, the processor 120 determines a streaming error which extends the streaming time due to the narrowed network bandwidth and thus immediately aborts the streaming in step 607. In step 608, the processor 120 requests to resend the segment at the lowest bit rate. In step 609, the processor 120 repeats steps 604 through 609 until the video play is finished. That is, the processor 120 counts the segment streaming time of a particular bit rate requested in accordance with the network environment. When the count exceeds a preset dt, the processor 120 immediately aborts the streaming and requests to resend the segment at the lowest bit rate. Hence, the play quality is lowered but the buffering or the freeze can be avoided.

When the streaming time exceeds the dt and the bit rate of the currently streamed segment is the lowest, the processor 120 can wait until the corresponding segment is streamed in entirety without aborting the streaming. Further, the processor 120 can accumulate and count the number of the consecutive requests for the segment of the lowest bit rate. When the count exceeds a preset count (e.g., 5 times), the processor 120 can determine a fatal network error and display an error message on the played screen, without requesting the retransmission, so that the user can perceive the current error.

Figure 7:
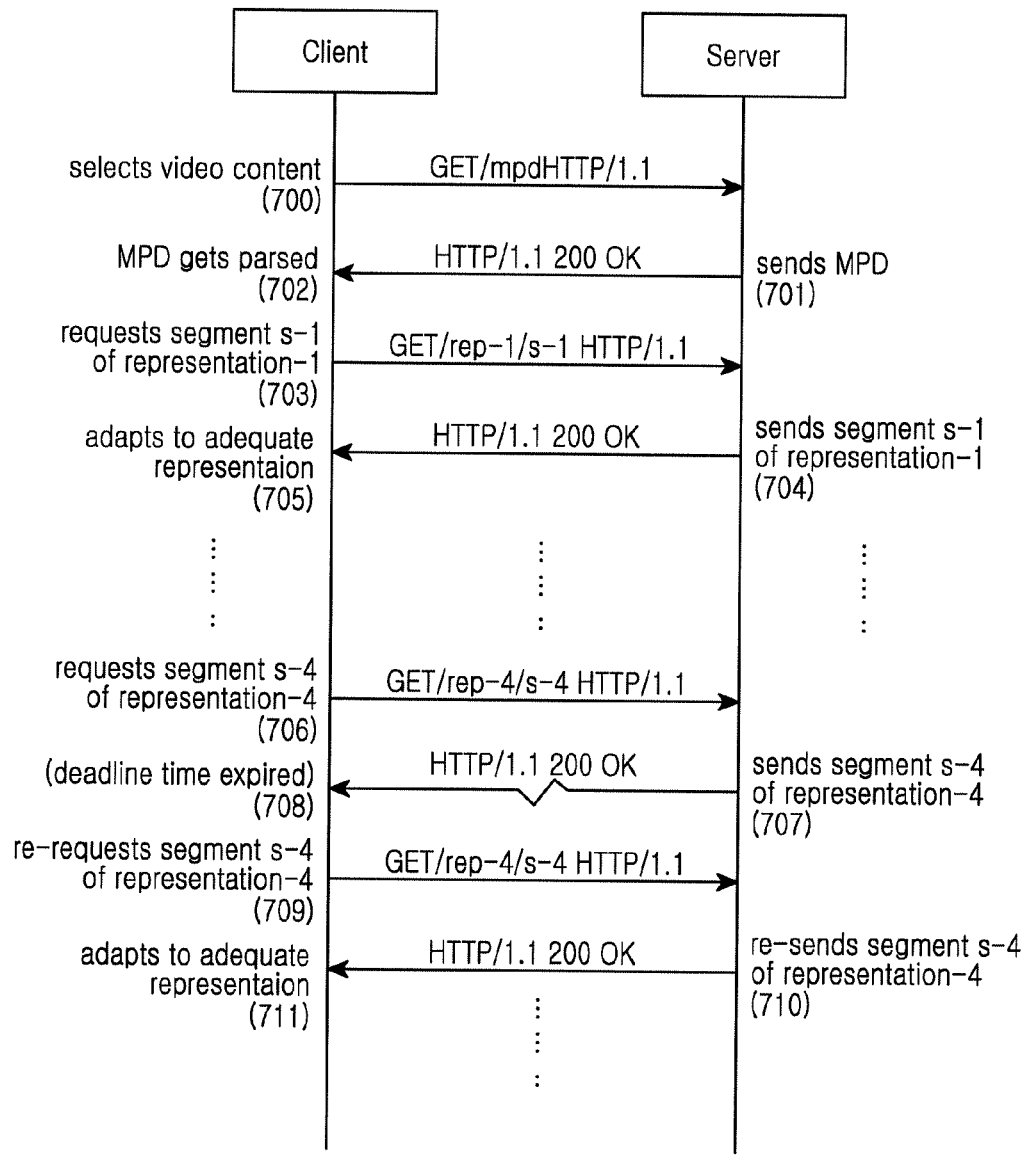
FIG. 7 illustrates operations between a server and a client according to one embodiment of the present disclosure.

FIG. 7 illustrates operations between a server and a client according to an exemplary embodiment of the present disclosure. Referring to FIG. 7, the client on the CCN can access various servers such as content server or CCN node. In step 700, the client sends to the server a message requesting to send the video content selected by the user. In step 701, the server sends the MPD file being the information file of the video content to the client.

In step 702, the client receives and parses the MPD file. For example, the client obtains the time value of the Segment List Duration and then determines the dt being the allowed data reception time in proportion to the time value of the Segment List Duration. In step 703, the client sends to the server a message for requesting to select and send a first segment of a particular bit rate adequate for the network environment. In step 704, the server streams the first segment of the particular bit rate to the client.

In step 705, when the streaming time of the first segment streamed from the server does not exceed the dt, the client receives and plays the first segment. Meanwhile, when the network bandwidth is narrowed, the client sends to the server a message for requesting to select and send a fourth segment of the particular bit rate adequate for the network environment in step 706. In step 707, the server streams the fourth segment of the particular bit rate to the client. When the streaming time of the fourth segment streamed from the server exceeds the dt, the client immediately aborts the streaming in step 708.

In step 709, the client sends to the server a message for re-requesting to select and send the fourth segment of the lowest bit rate. In step 710, the server streams the fourth segment of the lowest bit rate to the client. In step 711, when the streaming time of the fourth segment of the lowest bit rate streamed from the server does not exceed the dt, the client receives and plays the fourth segment. Hence, although the play quality of the client is declined, the buffering or the freeze of the played screen can be prevented.

Figure 8:
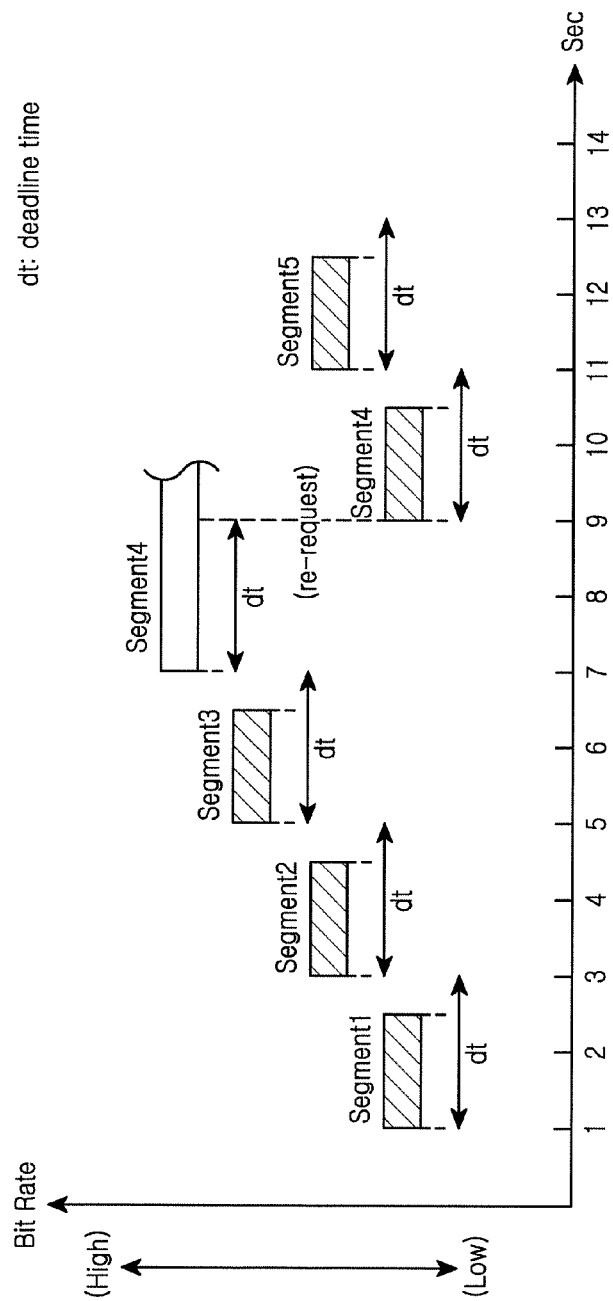
FIG. 8 illustrates the streaming according to one embodiment of the present disclosure.

FIG. 8 depicts the streaming according to an exemplary embodiment of the present disclosure. Referring to FIG. 8, due to the execution of the iRDA 170 of FIG. 1, the client can receive and play first, second, third segments adequate to the network environment at the growing bit rate.

Next, when the client requests and receives the fourth segment of the higher bit rate than the third segment from the server and the streaming time of the fourth segment exceeds the preset dt on account of the change of the network environment, the client can immediately abort the streaming of the fourth streaming and request the server to resend the fourth segment at the lowest bit rate.

As requested by the client, the server streams the fourth segment of the lowest bit rate to the client. The client receives and plays the fourth segment of the lowest bit rate within the dt. Hence, the quality of the played screen is degraded but the buffering or the freeze of the play screen can be avoided.

Further, during the reception of the fourth segment of the lowest bit rate, the client maintains the streaming even though the streaming time exceeds the dt. Thus, the client can avoid unnecessary network traffic for repeatedly re-requesting the fourth segment of the lowest bit rate.

As set forth above, even when the network environment changes while various electronic devices such as smart phone or tablet PC receive and play the streamed multimedia content such as video, the play can continue seamlessly.

When a network cache node exists between the server for streaming the multimedia content and the client for receiving and playing the streamed multimedia content, it can actively handle the network traffic variation.

The term "module" used in various exemplary embodiments of the present disclosure can indicate, for example, a unit including a combination of one or more of hardware, software, or firmware. The "module" can be interchangeably used with the term, for example, a unit, logic, a logical block, a component, or a circuit. The "module" can be a minimum unit or part of the components integrally formed. The "module" can be a minimum unit or part for one or more functions. The "module" can be implemented mechanically or electronically. For example, the "module" in the present disclosure can include at least one of an Application-Specific Integrated Circuit (ASIC) chip, Field-Programmable Gate Arrays (FPGAs), or a programmable-logic device for performing operations which are well known or to be invented.

At least part of the apparatus (e.g., modules or functions) or the method (e.g., operations) according to various exemplary embodiments of the present disclosure can be implemented as, for example, instructions stored in computer-readable storage media in the form of the programming module. When the instruction is executed by one or more processors (e.g., the processor 210), the one or more processors can perform the function corresponding to the instruction. The computer-readable storage medium can be, for example, the memory 220. At least part of the programming module can be realized (e.g., executed) by, for example, the processor 210. At least part of the programming module can include, for example, a module, a program, a routine, sets of instructions, or a process for one or more functions.

The computer-readable recording medium can include magnetic media such as hard disk, floppy disk and magnetic tape, optical media such as Compact Disc Read Only Memory (CD-ROM) and Digital Versatile Disc (DVD), magneto-optical media such as floptical disk, and hardware devices specifically configured to store and execute the program instruction (e.g., the programming module) such as Read Only Memory (ROM), Random Access Memory (RAM), and flash memory. Also, the program instruction can include not only a machine code made by a complier but also a high-level language code executable by a computer using an interpreter. The above-stated hardware device can serve as one or more software modules for fulfilling the operations of various exemplary embodiments of the present disclosure, and vice versa.

The module or the programming module according to various exemplary embodiments of the present disclosure can include at least one of the aforementioned components, omit some components, or further include other components. The operations fulfilled by the modules, the programming modules, or other components according to various exemplary embodiments of the present disclosure can be carried out in sequence, in parallel, repeatedly, or heuristically. Also, some operations can be executed in a different order or omitted, or other operations can be added.

While the disclosure has been shown and described with reference to certain exemplary embodiments thereof, it will be understood by those skilled in the art that various changes in form and details can be made therein without departing from the spirit and scope of the disclosure as defined by the appended claims and their equivalents.

What is claimed is:

1. A method for operating an electronic device, the method comprising:
   receiving an information file of a multimedia content from a server;
   identifying a play time for a segment related to the multimedia content based on the information file of the multimedia content;
   determining an allowed reception time for the segment based on the play time for the segment, the allowed reception time shorter than the play time for the segment;
   receiving the segment from the server;
   counting a streaming time of the received segment;
   determining whether the counted streaming time of the received segment exceeds the allowed reception time for the segment;
   in response to determining that the counted streaming time of the received segment exceeds the allowed reception time for the segment, determining whether a bit rate of the received segment exceeding the allowed reception time is the lowest; and
   in response to determining that the bit rate of the received segment exceeding the allowed reception time is not the lowest, stopping a streaming of the received segment and requesting the server to resend the segment in a lowest bit rate.

2. The method of claim 1, wherein the information file is a Media Presentation Description (MPD) file of a Moving Picture Experts Group (MPEG)-Dynamic Adaptive Streaming over Hypertext Transfer Protocol (HTTP) (DASH).

3. The method of claim 1, wherein the allowed reception time is proportional to the play time for the segment, and shorter than the play time for the segment.

4. The method of claim 1, further comprising:
   receiving and playing the segment of the multimedia content, and comparing a streaming time of the segment to the allowed reception time.

5. The method of claim 1, further comprising:
counting a number of consecutive requests for a retransmission; and
aborting a retransmission request and displaying a network error message when the number of consecutive requests for retransmission exceeds a preset count.

6. The method of claim 1, wherein, in response to determining that the bit rate of the received segment exceeding the allowed reception time is the lowest, a retransmission is not requested.

7. The method of claim 1, wherein the server partitions the multimedia content into segments of different bit rates, and stores the multimedia content in a storage.

8. An electronic device comprising:
a communication interface configured to access a server; and
a processor configured to communicate with the server accessed through the communication interface,
wherein the processor is configured to:
receive an information file of a multimedia content from the server;
identify play time for a segment related with the multimedia content based on the information file of the multimedia content;
determine allowed reception time for the segment based on the play time for the segment, the allowed reception time shorter than the play time for the segment;
receive the segment from the server;
count a streaming time of the received segment;
determine whether the counted streaming time of the received segment exceeds the allowed reception time for the segment;
in response to determining that the counted streaming time of the received segment exceeds the allowed reception time for the segment, determine whether a bit rate of the received segment exceeding the allowed reception time is the lowest; and
in response to determining that the bit rate of the received segment exceeding the allowed reception time is not the lowest, stop a streaming of the received segment and request to resend the segment in a lowest bit rate.

9. The electronic device of claim 8, wherein the information file is a Media Presentation Description (MPD) file of a Moving Picture Experts Group (MPEG)-Dynamic Adaptive Streaming over Hypertext Transfer Protocol (HTTP) (DASH).

10. The electronic device of claim 8, wherein the allowed reception time is proportional to the play time for the segment, and shorter than the play time for the segment.

11. The electronic device of claim 8, wherein the processor is configured to receive and play the segment of the multimedia content, and compare a streaming time of the segment to the allowed reception time.

12. The electronic device of claim 8, wherein the processor is configured to count a number of consecutive requests for retransmission, and abort a retransmission request and display a network error message when the number of consecutive requests for retransmission exceeds a preset count.

13. The electronic device of claim 8, wherein, in response to the bit rate of the received segment exceeding the allowed reception time is the lowest, the processor is configured not to request a retransmission.

14. A non-transitory computer readable recording medium on which a computer program for executing a method is recorded, the method comprising:
receiving an information file of a multimedia content from a server;
identifying play time for a segment related with the multimedia content based on the information file of the multimedia content;
determining allowed reception time for the segment based on the play time for the segment, the allowed reception time shorter than the play time for the segment;
receiving the segment from the server;
counting a streaming time of the received segment;
determining whether the counted streaming time of the received segment exceeds the allowed reception time for the segment;
in response to determining that the counted streaming time of the received segment exceeds the allowed reception time for the segment, determining whether a bit rate of the received segment exceeding the allowed reception time is the lowest; and
in response to determining that the bit rate of the received segment exceeding the allowed reception time is not the lowest, stopping a streaming of the received segment and requesting the server to resend the segment in a lowest bit rate.

* * * * *